Jan. 28, 1930.  S. C. CUTLER  1,744,826
AIR MOISTENING DEVICE
Filed Feb. 18, 1927
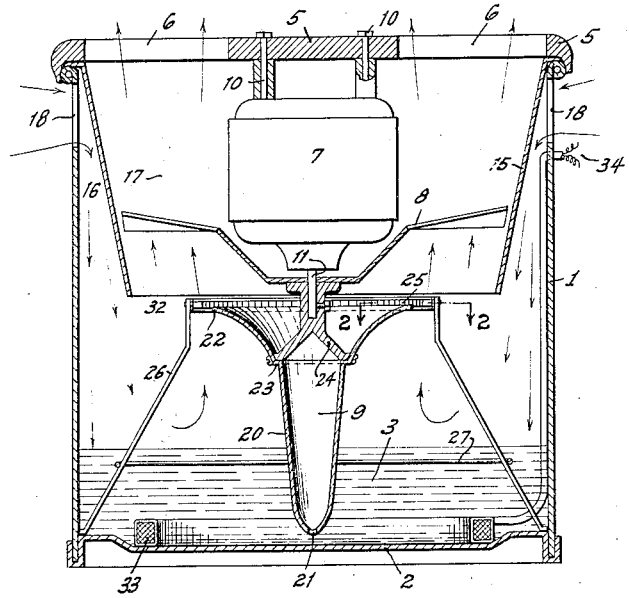
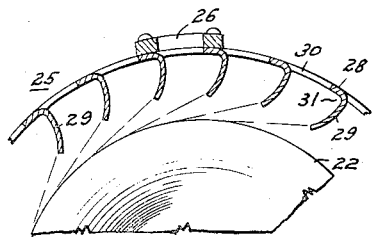
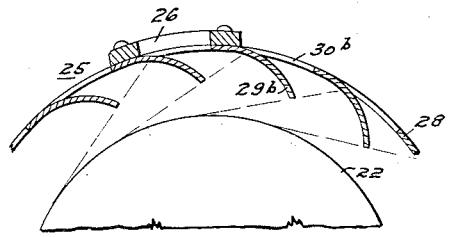
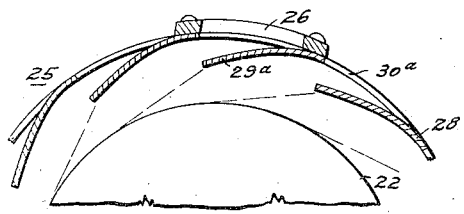
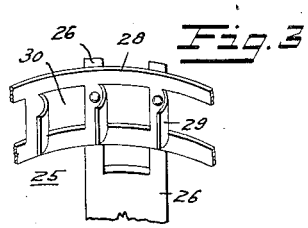
INVENTOR.
Samuel C. Cutler
BY Duell, Dunn & Anderson
ATTORNEYS.

Patented Jan. 28, 1930

1,744,826

UNITED STATES PATENT OFFICE

SAMUEL C. CUTLER, OF MURRAY HILL, NEW JERSEY

AIR-MOISTENING DEVICE

Application filed February 18, 1927. Serial No. 169,337.

This invention relates to air moistening devices and more particularly to small portable units adapted for household use.

The object of this invention is to produce a device of the character described in which the maximum amount of water may be disseminated as vapor into the atmosphere with a simple apparatus occupying little room.

It is a further object to produce a device of the character described, which will be simple in construction and assemblage and efficient in operation.

It is a further object to produce a device of the character described in which the maximum evaporization may be caused with a minimum of noise.

Other objects of the invention will be in part obvious and will in part appear hereinafter.

In ventilation of houses the humidification of the air may be utilized to advantage in two different ways. In the summer time the temperature may be materially reduced by humidification because of the cooling effect of the evaporation. Under such circumstances it is desirable, generally, to bring the air into contact with water at as low a temperature as practicable, since this assists in reducing the temperature.

In the winter time, however, humidification plays a different part. Whenever air brought in from the outside is artificially heated, its percentage of moisture is materially reduced. For example, even if the outside air be completely saturated at a low temperature and this air be artificially warmed to 70 degrees without increasing its moisture content, it will result in an extremely dry atmosphere, by reason of the fact that dryness is measured not by moisture content, but by the ratio which that quantity bears to the content of saturated air at that temperature and pressure. Air, at a temperature of 70 degrees, when saturated carries many times as much moisture as saturated air at the lower temperature, so that the total moisture content of the cold air, even if saturated, is but a small fraction of the moisture required to saturate the warm air. This results in some instances in ventilated houses on cold days having humidity of less than 10% of saturation, whereas the human system does not readily adjust itself to a humidity below 40%.

These extremely dry atmospheres not only produce harmful drying effects upon the furniture and house furnishings, but they are a menace to the health of the occupants. They cause undue stimulation of the skin and of the mucous membranes and of the nervous systems connected therewith, and furthermore, they render the occupants unusually liable to colds. Where a slight draft of such extremely dry air passes over the skin, its cooling effect is so great because of its dryness as to be far more dangerous than very extensive currents of more moist air.

For the foregoing reasons it will be obvious that in the summer time it is desirable to reduce the air temperature to the maximum possible, independent of the quantity of moisture delivered to the air. In fact, the air may be sprayed with water at a temperature below the dew point, and actually have its moisture content reduced. In the winter time, however, it is desirable to increase the moisture content as much as possible, while the temperature of the issuing air is of relatively small importance, since the primary heating system can be readily arranged to take care of any variations in temperature.

It is an object of this invention to provide a system which will be capable of performing both these functions, that is, to effect the maximum temperature reduction when desired and to effect maximum evaporation possible when that be desired, without regarding the temperature.

In dwellings, moreover, there accumulate in the air various odors from cooking and respiration and from other causes which render the room objectionable as a habitation, independent of its temperature. A ventilating system which would afford sufficiently complete renewal of the air to avoid this defect requires a great expenditure of heat to maintain the temperature of the apartment and would, in itself, maintain the apartment so dry as to be objectionable. It is a further object of this invention, therefore, to provide a small, portable apparatus which may be used within an apartment to remove the objectionable odors from the air by washing the air with water or with solutions of deodorants.

The quantity of moisture which should be injected into the atmosphere of a dwelling to compensate for the rise in temperature caused by the heating system is quite material and where this is to be supplied by a small, portable apparatus it is desirable to cause as large an evaporation as possible. When this is attempted, however, there is a tendency to cause the production of drops of water of material size, which are thrown into the room in the form of a fog, which is not easily dispersed and which is not conducive to the uniform moistening of the atmosphere. The maximum of evaporation in a small apparatus of this kind can be effected by reducing the size of the water particles to a minimum, whereby the surface area is increased.

Most dwellings are provided with heating systems, but without any means of cooling by moistening in summer or of humidifying in winter. It is a further object, therefore, of this invention to provide a device of the character described which may be purchased as a unit and installed within a dwelling as a separate, portable device, and as such is ready of access for cleaning and simple in construction and efficient in operation.

Where such a device is employed in a room, moreover, it is important that its operation be as quiet as possible, in order that it may not disturb the occupants of the room. The noises of the motor and of the moving mechanical parts may be reduced to a minimum by proper mechanical construction, but there is a further source of noise in the impact of the water thrown off from the centrifugal parts upon the interior of the casing. It is an object of this invention to produce a device of the character described in which internal noises are reduced to a minimum.

The invention accordingly comprises the features of construction, combinations of elements and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a cross section of an apparatus embodying this invention.

Figure 2 is a fragmental section on the line 2—2 of Figure 1 to an enlarged scale.

Figure 3 is a perspective view of the intercepting ring shown in Figure 2.

Figure 4 is a view similar to Figure 2 of a modified form of the appartus, and

Figure 5 is a further modification.

In the drawings the numeral 1 comprises a casing which may be of general cylindrical form closed by a bottom 2 to form a compartment adapted to contain water, as shown at 3. This compartment may be made of metal or fibre or any other convenient material. The apparatus, however, may be caused to operate more silently when the casing is of non-metallic construction. A frame 5 is arranged to fit upon the casing 1 and is herein designated as a cover, although it may be provided with openings 6 and thus may not serve as a closure for the container. This cover 5 serves to support the rotating parts of the mechanism comprising a motor 7, a fan 8 and a pumping element 9. The motor 7 may be attached to the spider by bolts 10, which hold it in axial alignment with the casing. The fan 8 and pump 9 are mounted upon the projecting rotating shaft 11 of the motor 7. An annular apron 15 of generally conical form, may rest upon the top of the casing 1 and extend downwardly and inwardly therefrom, thereby dividing the casing into two passageways, generally indicated by the numerals 16 and 17. Inlets 18 may be provided in the outer wall of the casing to afford entrance into the outer passageway 16, while the fan 8 is disposed in the passageway 17. This fan is preferably so disposed as to cause an upflow of air through the passageway 17, thereby inducing the entrance of air through the openings 18 and downwardly through the passage 16 around the bottom end of the apron 15.

The pumping element 9 preferably has a body portion 20 in the form of a steep cone having an inlet at the bottom, as shown at 21. The pitch of this cone may be so chosen that water will not be carried upwardly upon its outer surface. This accomplishes the result that all of the water sprayed by the machine enters the interior of the cone through the opening 21, and hence the quantity delivered is substantially independent of the height of the water in the sump 3. The pumping element is provided with a bell mouth 22, which discharges the water tangentially in a horizontal plane. It is convenient to join this bell mouth to the conical body by a shoulder 23, which serves the function of obstructing the flow of water upwardly on the outside of the cone and at the same time, furnishing a shoulder on the interior, by means of which the cone may be attached to a spider 24 carried by the shaft 11. The pumping element may be constructed by a spinning operation, so that the shoulder 23 is in accurate coaxial alignment with the conical body and the bell mouth. The shoulder thus serves as a ready means of accurately aligning the pump with the axis of the shaft.

Where water is delivered from a rotating element such as the one herein illustrated, an increase in the quantity of water delivered beyond a certain point will cause the formation of a sheet of water extending tangentially from the periphery to the outer vessel and if a current of air be passed through such a sheet, there is a tendency for the air to carry with it drops of water of material size, which are objectionable. To remedy this defect, and to permit the device to be used for the distribution of large quantities of water I provided, in the pathway of the discharged water, an intercepting element 25, which is arranged to increase the water surface with which the air comes in contact. This element 25 is kept in accurate alignment with the pump by reason of legs 26, which extend downwardly and outwardly and bear against the peripheral edge of the bottom of the receptacle 1. These legs may be retained in relative position by a ring 27, which encircles them and braces one against the other. It will thus be seen that the intercepting element is a detachable unit, which may be removed to clean or repair the machine and which may be inserted with facility, and which will come into accurate alignment without the necessity of adjustment.

In order to reduce the noises resulting from the impact of the water thrown off from the pump upon the intercepting device, it is desirable that the intercepting device shall receive the water as nearly tangentially as possible. This accomplishes, also, the result of a minimum electrification of the spray produced. The intercepting device is conveniently made in the form of a band of material 28, having vanes 29 punched from its surface (see Figure 3) and bent inwardly, so as to provide openings 30. In Figure 2 is illustrated a form of the vane in which the water is received substantially tangentially to the vane and carried backwardly to be discharged through the opening 30. This form of vane provides a pocket 31 where the vane is bent back upon itself, which causes the water to tend to accumulate and to be forced upwardly and downwardly, thus spreading the moisture in a vertical direction as well as horizontally. In the form illustrated in Figure 4 the vane $29^a$ is bent in a different direction and is also arranged to receive the water tangentially. In this form, however, the moisture is carried forwardly in the direction of rotation, to be discharged through the openings $30^a$ without encountering any reversal in direction or being obstructed by any pocket, such as 31.

In the form illustrated in Figure 5 the vane $29^b$ is arranged to receive the spray substantially normal to the surface of the vane. The impact of the water upon the vane thus causes a maximum of spray to be produced. The moisture, after leaving the intercepting device in this form, will exit partly through the openings $30^b$ but will in large part be given off as a mist both upwardly and downwardly from the intercepting device.

As will be seen from the drawings, the intercepting device 25 is in close proximity to the pump and the dimensions are such as to provide a substantial passageway 32 between the exterior of the intercepting device and the lower edge of the apron 15. Where the intercepting devices are in the form illustrated in Figures 2 and 4, this passageway 32 will be the main passageway for the air and the moisture issuing from the openings 30 will play a predominant part in the humidification.

Where the form illustrated in Figure 5 is used, however, the intercepting device may be of larger diameter and a material portion of the humidification may be caused by the passage of the air between the intercepting device and the pump and between the vanes $29^b$ of the intercepting device itself.

Where it is desired to use the device for moistening purposes, there is provided in the receptacle 1 a heating element 33 which may be controlled by a switch at the point 34, which may conveniently be associated with the control for the motor 7. This heating element may, to advantage, have a plurality of degrees of heat, since the quantity of moisture to be absorbed from the device may be varied within wide limits by the control of the heat of the water.

Where water is evaporated at atmospheric temperatures its latent heat of vaporization is so high as to materially reduce the temperature of the entering air. This results in lowering the relative humidity of the air not only because of the added moisture, but also because the decreased temperature corresponds to a lower maximum humidity at saturation. The air is thus in a position to take up less moisture than it otherwise would. If, however, sufficient heat be added to supply the latent heat of vaporization of the water, the air may be humidified without reducing its temperature and hence, a greater quantity of moisture may be delivered to the air in vapor form. Should it be desired to still further increase the rate of vaporization, this may be accomplished by increasing the temperature of the water. This may be carried to the point of actually discharging from the device a mist or steam higher than room temperature, but by reason of its temperature containing sufficient heat units to be readily evaporated on contact with the air.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid and a band of materially smaller diameter than said sleeve surrounding the periphery of the cone pump and having vanes for the interception of the spray whereby the air drawn downwardly through one of said passageways and upwardly through the other by the fan is caused to pass transversely through the spray discharged from said vanes.

2. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid and a band of materially smaller diameter than said sleeve surrounding the periphery of the cone pump and having vanes for the interception of the spray whereby the air drawn downwardly through one of said passageways and upwardly through the other by the fan is caused to pass transversely through the spray discharged from said vanes, and arms extending to the interior of the bottom of said casing for supporting said band.

3. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid and a band of materially smaller diameter than said sleeve surrounding the periphery of the cone pump and having vanes tangential to the spray for the interception of the spray whereby the air drawn downwardly through one of said passageways and upwardly through the other by the fan is caused to pass transversely through the spray discharged from said vanes, and arms extending to the interior of the bottom of said casing for supporting said band.

4. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid, said cone having a discharge periphery just below the edge of said sleeve whereby air drawn downwardly through one of said passageways and upwardly through the other is caused to pass twice transversely through the spray.

5. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid, said cone having a periphery just below the lower edge of said sleeve and said fan being arranged to withdraw air downwardly through said outer passageway and upwardly through the central passageway whereby it is caused to pass first transversely through a finer spray and subsequently upwardly through a coarser spray.

6. An air moistening device comprising, in combination, a cylindrical casing to receive liquid, a sleeve member concentric with said casing and dividing it into concentric passageways one of which serves as an air inlet and one of which serves as an air outlet, a cover member supported from the rim of said casing having air openings in said air passageway, a motor supported by said cover and a fan and cone pump supported by said motor, said pump being in contact with the liquid, and a band of materially smaller diameter than said sleeve surrounding the periphery of the cone pump having vanes for the interception of the spray, and arms extending to the interior of the bottom of said casing for the supporting of said band, said cone periphery and said band lying in a plane just below the lower edge of said sleeve whereby air drawn downwardly through one of the passageways by the fan to be forced upwardly through the other is caused to pass twice through said spray.

In testimony whereof I affix my signature.

SAMUEL C. CUTLER.